Sept. 9, 1947.  E. DAWSON  2,426,986
HYDRAULICALLY SYNCHRONIZED SERVO SYSTEM CONTROL
Filed May 17, 1943  4 Sheets-Sheet 2

INVENTOR
EDWARD DAWSON
BY Herbert W. Thompson
HIS ATTORNEY

Sept. 9, 1947.    E. DAWSON    2,426,986
HYDRAULICALLY SYNCHRONIZED SERVO SYSTEM CONTROL
Filed May 17, 1943    4 Sheets-Sheet 4

INVENTOR
EDWARD DAWSON
BY
*Herbert H. Thompson*
HIS ATTORNEY

Patented Sept. 9, 1947

2,426,986

UNITED STATES PATENT OFFICE 2,426,986

HYDRAULICALLY SYNCHRONIZED SERVO SYSTEM CONTROL

Edward Dawson, New York, N. Y., assignor to Sperry Gyroscope Company, Inc., a corporation of New York Application May 17, 1943, Serial No. 487,395

9 Claims. (Cl. 121—41)

My invention particularly relates to a control system for servomotors particularly useful in computer systems and in which coarse and fine fluid control valves are employed to control both the direction and rate of operation of the associated servomotor.

In control systems of this character, the fine control valve is operative to control the servo when the error angle between a reference member and the element positioned or driven by the servo does not exceed some predetermined value, while for all other, larger values of error angle the servo is controlled by the coarse valve. Ordinarily, the coarse and fine valves are operated in relatively unequal but constant ratio relationship with respect to the reference member, and the operations thereof may be effected through Selsyn systems and associated gearing. For example, angular movement of the valve element of the coarse valve may take place in a 1:1 ratio with respect to the reference member, while that of the valve element of the fine valve may take place in a 15:1 or 27:1 ratio, or in any suitable odd, preferably composite number, ratio.

A synchronizing device is employed to render the fine control valve ineffective in its control over the servomotor and to connect the servomotor directly with a source of fluid under pressure when the error angle exceeds a predetermined value. Under this latter condition, while the coarse valve, through the synchronizer, controls the direction in which the servomotor is driven, the servo will operate at maximum rate. The synchronizing device, one of the novel features of this invention, functions to return the control of the servomotor to the fine control valve when, and only when, the element driven and positioned by the servo lies within the predetermined maximum error angle with respect to the position of the reference element.

It is an object of my invention to provide a control system for servomotors in which coarse and fine control valves are employed and in which a hydraulically operable synchronizing device is incorporated.

It is another object of this invention to provide a novel form of hydraulic synchronizer. A still further object resides in providing a hydraulic synchronizer which, under the control of a valve, is operable to connect either end of a hydraulic motor to a source of fluid under pressure and the other side thereof to exhaust, depending upon the operation of the valve controlling the same, and which is otherwise operable operatively to connect a second control valve in controlling relation to the servomotor.

Another object resides in providing a hydraulic synchronizer of the foregoing character which is so constructed and arranged that movement of the valve elements thereof from one position to another will take place very rapidly following an initial movement thereof.

Still another object resides in providing a novel fluid control valve which may be employed either as the coarse or the fine control valve in a hydraulic system.

Another object lies in providing a control valve which is characterized by the fact that the rotatable valve element therewithin may be operated by torques of comparatively small magnitudes; that the valve element is hydraulically balanced whereby for all operating positions thereof, locking or binding is prevented; and the valve elements may freely rotate under all conditions. It is a further object to provide a hydraulically balanced valve of this character which is simple in construction and may be easily manufactured.

With the foregoing and other objects in view, my invention includes the novel control system and the novel control elements therein contained which are described below and illustrated in the accompanying drawings, in which.

Figure 1:
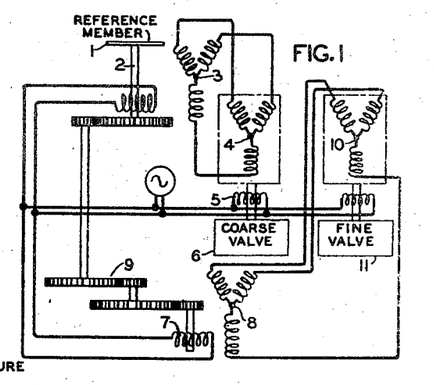
Fig. 1 schematically represents one manner of operatively connecting the coarse and fine control valves of my system with a reference member.

In the embodiment of my invention herein illustrated and particularly illustrated in Fig. 1, I have shown a reference member indicated generally at $l$ which may be positioned or moved either manually or automatically to provide a positional reference employed in controlling the operation of a servomotor and the positioning thereby of some positionable object or element.

For example, the reference member may be associated with or constitute the data output shaft of a computer system and the positionable object may comprise a turret or plurality of turrets.

In the embodiment shown, the reference member 1 is directly coupled to the shaft 2 of a transmitter 3, which may be a Selsyn or Autosyn transmitter. The stator of the transmitter is electrically connected with the stator 4 of a similar device or receiver, the rotor 5 of said receiver being electrically connected with the source of alternating current employed in feeding the rotor of the transmitter 3 and rotor 5 being mechanically connected with the rotatable valve element, hereinafter described, of a coarse control valve 6. With this arrangement, the valve member of the control valve 6 will rotate synchronously with the reference member in a 1:1 ratio. The rotor 7 of a second Selsyn or Autosyn transmitter 8 is also electrically connected with the source of alternating current feeding the above-described transmitter and receiver and is mechanically connected with the rotor of the transmitter 3 through a gear train indicated generally at 9. The gear train is so arranged that the rotor 7 of transmitter 8 will rotate in a ratio of, for example, 27:1 with respect to the rotor of transmitter 3. The stator of the transmitter 8 is electrically connected with the stator of a receiver 10, the rotor of which is electrically connected with the above-mentioned source of alternating current and mechanically connected with the valve element of a second or fine control valve 11.

From the foregoing it will be observed that the valve element of valve 11 will have an angular displacement of twenty-seven times that of the valve element of control valve 6 or, in other words, the magnitude of movement of reference member 1 as reflected in the movement of the valve element of valve 11 will be magnified twenty-seven times.

Figure 2:
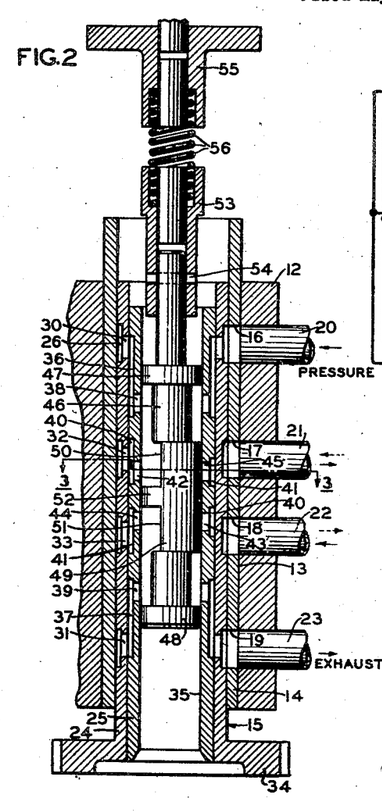
Fig. 2 is a fragmentary, longitudinal section through my novel form of fluid control valve.
Figure 8:
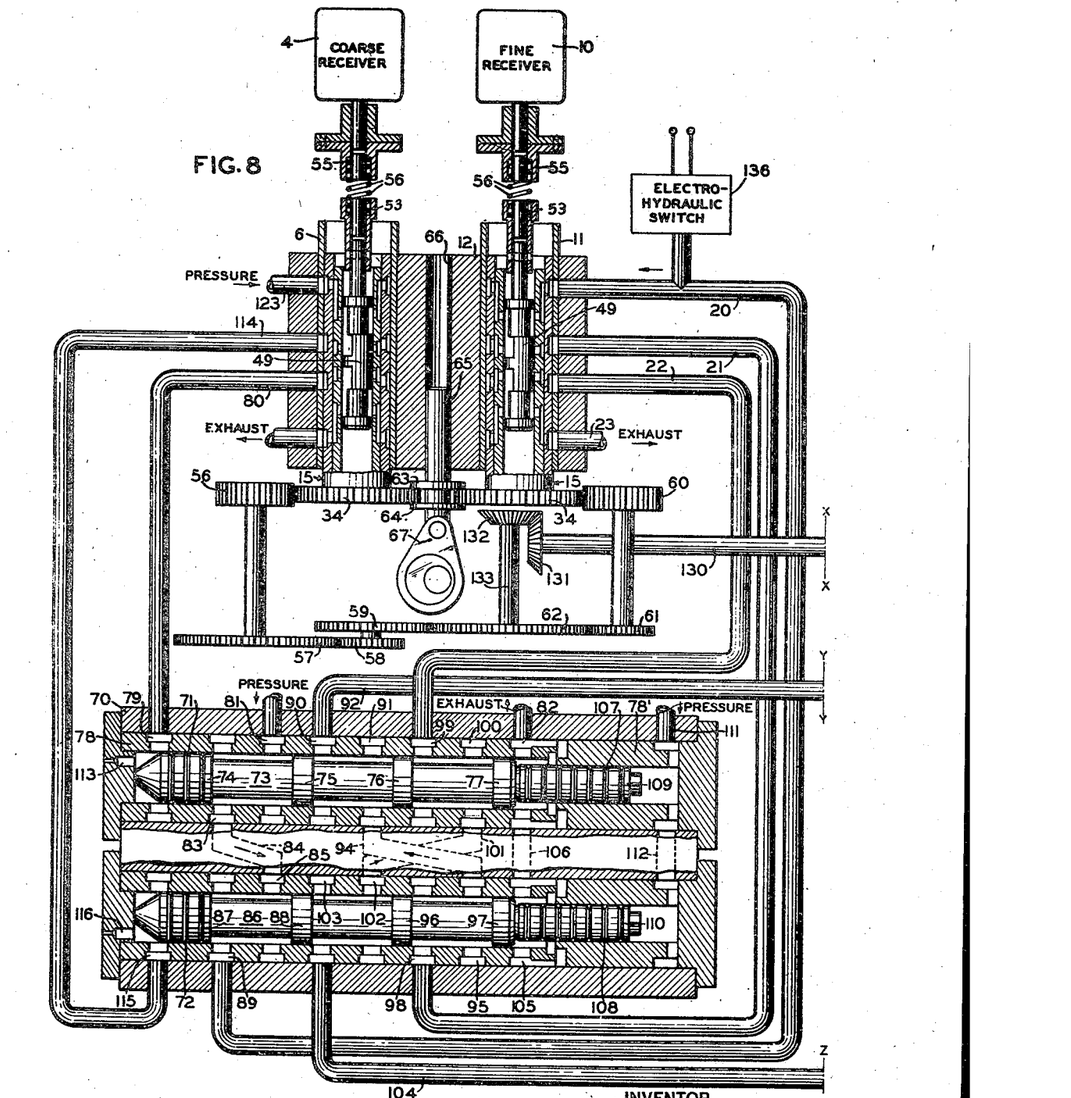
Fig. 8 discloses in part my novel servomotor control system, the valve elements and synchronizer being shown in section.

In practice, the valves 6 and 11 as shown in Fig. 8 are embodied in one casing, and, in accordance with my invention, may be substantially identical in design and size. The preferred form of my novel fluid control valve is illustrated in Fig. 2 wherein 12 indicates the valve body or casing within which the valve sleeves and rotary valve spools are rotatably mounted. The body 12 is provided with an axially extending bore 13 which, in the embodiment shown, has a sleeve 14 securely fastened therewithin and within which the valve sleeve 15 may be rotatably mounted. Sleeve 14 is provided with openings 16, 17, 18 and 19 which are adapted to register respectively with passages in the valve body 12. In each or to each of these passages is connected conduits 20, 21, 22 and 23, which are connected in the control system. Within the bore of the sleeve 14 is rotatably fitted a valve sleeve 15 and, as hereinafter described, said sleeve is designed to be oscillated to a small degree axially of the bore of the valve.

Figure 4:
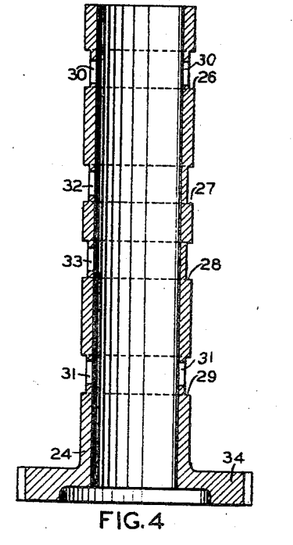
Fig. 4 is a longitudinal section of the outer member of the valve sleeve.
Figure 5:
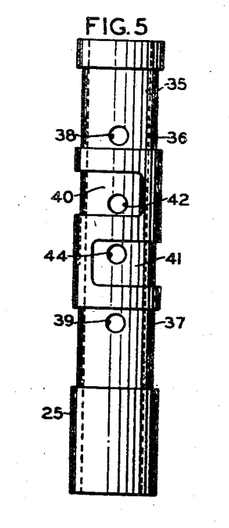
Fig. 5 is an elevational view of the inner member of the valve sleeve.

The construction of the valve sleeve 15 and its inner and outer component members is best illustrated in Figs. 4 through 7. Referring first to Fig. 4, the outer member of the valve sleeve comprises a generally cylindrical body 24 within which the inner sleeve member 25, shown in Fig. 5, is adapted to be fixedly secured, whereby the two members will move as an integral unit. The outer member 24 is provided with a plurality of axially spaced grooves 26, 27, 28 and 29 which, when operatively mounted within the valve body, are adapted continuously to register respectively with the passages 16, 17, 18 and 19.

The walls of member 24 are provided with diametrically opposed openings or ports 30 which connect with the interior thereof and with the groove 26. Likewise, openings or ports 31 connect between the groove 29 and the interior of sleeve member 24. A single port 32 affords communication between the groove 27 and the interior of the member 24 and, in axial alignment therewith, a single port opening 33 affords communication between the groove 28 and the interior of member 24. A gear 34 may be mounted on the lower end of the member 24 or may be formed integral therewith, as illustrated.

The inner member 25 of the valve sleeve, for purposes which will become apparent as the description proceeds, is designed to be mounted within the outer member 24 and secured thereto to form a unitary structure. The inner member 25 is generally cylindrical and provided with an interior, axially extending bore 35. Axially spaced groves 36 and 37 are adapted when the two sleeve elements are fastened together to lie in communication with the lateral ports 30 and 31, respectively. Laterally extending ports 38 and 39 afford communication between the grooves 36 and 37, respectively, and the interior of the member 25. The cylindrical surface of the member 25 lying intermediate the grooves 36 and 37 is provided with a pair of grooves indicated generally at 40 and 41, which grooves extend peripherally of the member 25 slightly in excess of 180° and also axially of said member.

Figure 7:
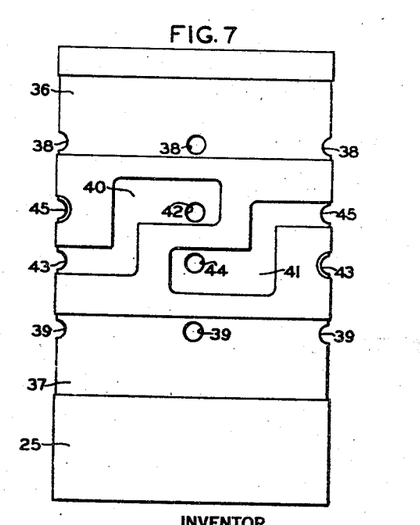
Fig. 7 is a development of the inner sleeve member shown in Fig. 5.

The configuration of grooves 40 and 41 is more clearly shown in Fig. 7. A pair of laterally extending ports 42 and 43 communicate with the interior of the member 24 and with the groove 40 adjacent opposite ends thereof. In other words, the ports 42 and 43 are diametrically opposite each other but spaced axially of the sleeve member 25. Likewise, lateral ports 44 and 45 communicate with the interior of member 25 and exteriorly thereof with the groove 41 adjacent opposite ends thereof. These ports will likewise lie generally diametrically opposite but in axially spaced relation to each other.

Figure 6:
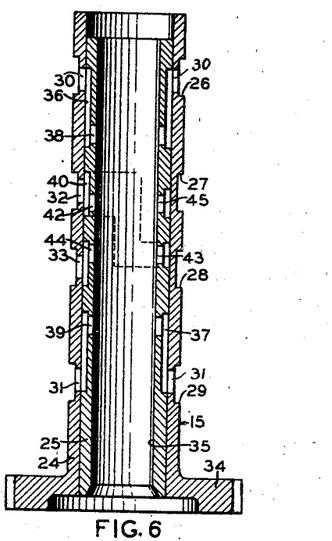
Fig. 6 is a longitudinal section taken through the inner and outer members of the valve sleeve operatively secured together in fixed relation.

The relative association of the inner and outer valve sleeve members when fixed in relation to each other to provide the unitary valve sleeve structure 15 is illustrated in Fig. 6. It will be noted that groove 36 forms an annular passage within the interior of the sleeve connecting the ports 38 with the ports 30. Likewise, the groove 37 provides an interior passage connecting the ports 31 and 39. Furthermore, the groove 40 forms an interior passage connecting the port 32 in the outer sleeve member with the port 43 in the inner sleeve member whereby fluid supplied through the port 32 may be conducted axially of the valve sleeve and interiorly thereof, and discharged through the port 43 to the interior of the sleeve and in a zone diametrically opposite but axially spaced from the port 32. At the same time, the port 42 will lie in communication with the port 32. As hereinafter explained, passage of fluid through the port 42 or port 43 is controlled by a rotary valve spool rotatably mounted within the bore 35 of the valve sleeve. Similarly, although the passage formed thereby is not illustrated in Fig. 6, the groove 41 connects the exterior port 33 with the interior port 44 and also with the axially spaced interior port 45. Passage of fluid through these latter ports will also be controlled by rotary valve spool rotatably mounted within the sleeve.

When the valve sleeve 15, comprising the inner and outer members 24 and 25, is operatively and rotatably mounted within the valve casing 12, it will occupy the position shown in Fig. 2 wherein the grooves 26, 27, 28 and 29 register respectively with the passages 16, 17, 18 and 19 in the relatively fixed valve body. As hereinafter described, means are provided for effecting a slight axial oscillation of the valve sleeve 15 and it will be clearly evident that such motion may take place because of the axial extent of the grooves in the exterior of the valve sleeve or their registering passages in the valve body.

Within the valve sleeve is rotatably mounted a rotary valve spool or piston indicated generally at 46 and comprising the spaced lands 47 and 48 which are adapted closely but slidably and rotatably to fit within the valve sleeve 15 and to effect axially spaced closures within the sleeve 15. Intermediate the lands 47 and 48, the valve 46 is provided with an enlarged cylindrical portion 49 which is adapted closely to fit within the bore of the sleeve 15. The enlarged portion 49 is milled, as indicated at 50 and 51, or otherwise formed to provide a partial cylindrical valving surface adapted to control the flow of fluid through the interior ports of the valve sleeve, adjacent which the valve 46 rotates. By milling the valve member in spaced relation as indicated, a completely cylindrical land 52 will be provided between axially spaced zones of the valving surface. The preferred circumferential extent of the valving surface 49 of the valve spool and the circumferential extent of the associated interior port openings is clearly illustrated in Fig. 3.

Figure 3:
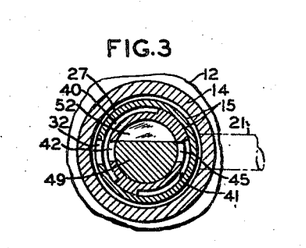
Fig. 3 is a transverse section of Fig. 2 taken in about the plane 3—3 thereof.

In Fig. 3, the valve spool has been rotated substantially 90° relative to the position thereof illustrated in Fig. 2, and it will be noted that in this position thereof the valving surface of the valve spool prevents flow of fluid between the bore of the valve sleeve 15 and both ports 42 and 45. In this position of the valve, communication between the ports 44 and 43 and the bore of the sleeve 15 will likewise be cut off. Preferably, when the valve spool occupies the position shown in Fig. 3 the edges of the valving portion thereof register with one edge of the associated ports so that rotary movements of the valve piston from the illustrated position thereof in either direction will produce substantially instantaneous port openings which progressively increase with greater magnitudes of relative movement of the valve piston and sleeve.

The valve piston 46, in the embodiment illustrated, is operatively connected with the rotor of either the coarse or fine Selsyn receiver through suitable couplings which comprise the first coupling element 53 which is secured to the valve piston 46 by means of pin 54 and a second coupling element 55 which is secured to the rotor of the Selsyn receiver. A helical torsion spring 56 is secured at opposite ends thereof to the coupling elements 53 and 55, respectively, whereby rotary movement of the rotors of the Selsyn receivers are transmitted to the valve pistons of the respective coarse and fine control valves, as clearly illustrated in Fig. 8.

By virtue of the gear train connection between the coarse and fine transmitters, the valve piston of the coarse valve will rotate to the same angular extent as the reference member while the valve piston of the fine control valve will rotate, for the values herein assumed, through an angular displacement equal to twenty-seven times the displacement of the reference member. Since the valve pistons are rotating relative to the valve sleeve they control the operation of the servomotor and each, in effect, provides a reference corresponding in some ratio to the reference provided by the reference member. Likewise, the valve sleeves also provide, as hereinafter more particularly described, a reference which is primarily indicative of the movement or position of the positionable element driven by the servo. In other words, assuming that the reference member is displaced at a given velocity, the associated rotary valve spools will be moved thereby to uncover one or more of the associated ports whereby to effect an operation of the servo to drive its load or positionable element in the same direction as that in which displacement of the reference member occurs and substantially at the same rate. Hence, when the servo, assuming a stroking piston controls the rate thereof, is operating at the rate corresponding to the rate of the reference member, the controlling port openings in the control valves should be closed and the positionable element will then continue closely to follow the reference member, assuming that its rate remains constant. Hence, movement of the load or positionable element should be reflected in a movement of the valve sleeves and the movements of the respective valve sleeves should bear the same ratio to each other as the movements of their associated valve spools.

In the embodiment illustrated, as shown in Fig. 8, this is accomplished by meshing the gears 34 associated with each valve sleeve in a gear train including the gears 56, 57, 58, 59, and gears 60 and 61, gears 56 and 60 meshing with the gears 34 of the valve sleeves and gears 59 and 61 meshing with a driving gear 62. The gear ratios of the gear train are so arranged that the sleeve of the control valve 11 will rotate with the sleeve of the valve 6 but through an angular displacement equal to twenty-seven times that of the sleeve of valve 6. Obviously, the driving gear 62 is driven in some suitable manner, as hereinafter more particularly described, from a load shaft or its equivalent of the servomotor.

As shown in Fig. 8, the gears 34 on the valve sleeves rotate between the spaced discs 63 and 64 forming a yoke on a shaft 65 which is mounted to reciprocate in a bore 66 in the valve body 12. An eccentric 67, driven from some suitable source of power, is connected to the shaft 65 and serves to oscillate the valve sleeves to a slight extent and axially of the bores of the valve in which they are mounted. It will be noted that the width of the gears 56 and 60 is sufficient to permit this slight oscillation.

In considering the operation of these valves, the operation of each being substantially identical, let us assume, considering valve 11, that the conduit 20 is connected to a source of fluid under pressure; conduit 21 is connected with one side of a hydraulic motor or the head end of the cylinder of a stroking piston; that conduit 22 is connected to the other side of said motor or the crank end of said cylinder; and the conduit 23 is connected to exhaust or to a suitable sump. When the valve piston occupies the position shown in Fig. 3, fluid under pressure may pass from the conduit 20 through the groove 26 and ports 30, the interior passage formed by the groove 36 in the valve sleeve and through ports 38 to the bore of the valve sleeve between the spaced lands 47 and 52 of the valve spool. However, the valving surface of the valve spool closes the ports 42 and 45 and hence fluid under pressure cannot be supplied either to the conduits 21 or 22. Likewise, in the above assumed relative position of the valve spool and sleeve, ports 44 and 43 are also closed by the valving portion of the spool. The exhaust conduit 23, however, lies in communication with the bore of the sleeve between the lands 48 and 52, this connection being established through the ports 39, groove 37, ports 31 and groove 29.

Assuming that the valve spool rotates to some extent in a counter-clockwise direction relative to the sleeve as viewed in Fig. 3, ports 42 and 44 will be uncovered and to an extent depending upon the degree of such relative movement thereby permitting fluid under pressure to pass from the space between the lands 47 and 52 through the port 42 and port 32 and groove 27 to the conduit 21, thereby supplying fluid under pressure to one side of the motor or to one side of the stroking piston. Since port 44 is simultaneously uncovered with port 42, the space between the lands 48 and 52 of the valve spool, which continuously communicates with the exhaust conduit 23, will be connected through ports 44 and 33 and groove 28 with conduit 22, thereby connecting the other side of the motor or stroking piston with exhaust. Under the above assumed conditions, fluid under pressure will cause the motor or stroking piston to be operated under fluid pressure supplied to the head end thereof and, in the case of the stroking piston, the rate of movement thereof will depend upon the size of the port opening, and the magnitude of such movement will depend upon the duration of the port opening.

Under the assumed conditions of relative rotation of the valve spool and sleeve, it will be observed that the ports 45 and 43 will be closed by the valving surface of the valve spool. Therefore, fluid cannot flow through these ports. However, if the valve piston is moved in a clockwise direction from the position thereof shown in Fig. 3, the ports 42 and 44 will remain closed but the ports 45 and 43 will be opened to some degree. When this occurs, fluid under pressure within the bore of the valve sleeve and between the lands 47 and 52 cannot pass to the conduit 21 and the head end of the stroking piston but will pass through the port 45, groove 41 to port 33, the valving surface of the spool closing the port 44 and thereby preventing escape of fluid therethrough. Fluid under pressure will therefore pass from port 33 and associated groove 28 to the conduit 22 and thence to the crank end of the hydraulic motor or stroking piston. At the same time, the space between the lands 48 and 52 will be connected through port 43 and groove 40 with port 32, port 42 being closed by the valving surface of the spool from communication with the interior bore of the valve sleeve. But, fluid may pass to groove 40 from port 32 which communicates through groove 27 with the conduit 21. Hence, the head end of the stroking cylinder will be connected with exhaust. Arrows in full line represent one condition of operation and arrows in dotted line represent a second condition.

Obviously, the direction of relative rotation of the valve piston and valve sleeve will determine the direction of operation of the servomotor controlled thereby, and the magnitude of such relative rotation will control the rate at which the servo is operated. For relative departure of orientation between the reference member and follow-up element, the valve spool and sleeve of both coarse and fine control valves will be relatively rotated but, of course, to different magnitudes of extent depending upon the gearing ratios therebetween. The relative operational characteristics of the coarse and fine control valves in terms of angular position of valve sleeve is graphically depicted in Fig. 11 wherein curve 68 represents the stroking piston rates provided the coarse valve were connected directly to control the stroking piston as above described and it is rotated through 180° in opposite directions toward zero or the point corresponding to synchronized operation of the reference member and positionable element. Curve 69 in a similar manner depicts the stroking piston rates which would be provided by the fine control valve if operatively connected continuously to control the stroking piston and when movement thereof corresponding to the above-described movement of the coarse control valve occurs.

Figure 11:
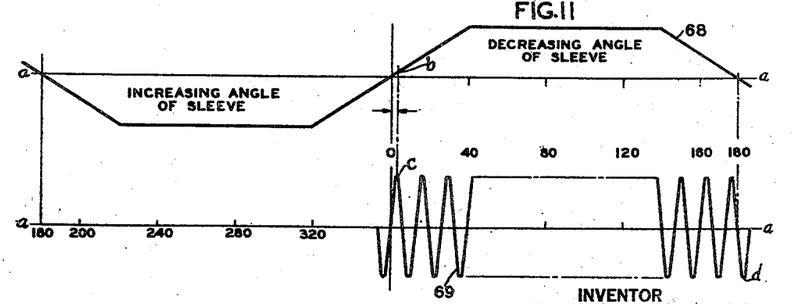
Fig. 11 discloses the operational curves of the coarse and fine control valves.

The curve above the axes a—a indicates decreasing angle of sleeve while that below the axes indicates increasing angle of sleeve and, in each case, representing operations of the servo but in opposite directions toward the zero point. It will be observed that between the 180° and 0° points the stroking piston rates, as controlled by the coarse valve, vary from zero to maximum and back to zero again at the zero position, while the corresponding stroking piston rates, if controlled by the fine control valve, vary from zero to a maximum on the decreasing angle side of the curve and back through zero to a maximum on the increasing angle side, and that this continues thirteen and one-half times throughout 180° because of the 27:1 assumed ratio.

The manner in which the hydraulic synchronizer shifts control of the servomotor from the coarse or fine control valve to the other will be hereinafter explained, but it will be observed at this point that a much more accurate control will be effected if the fine control valve is operatively connected with the servomotor for small error angles than if a coarse control valve alone, having a 1:1 ratio of movement with respect to the reference member, were employed in its stead.

Figure 10:
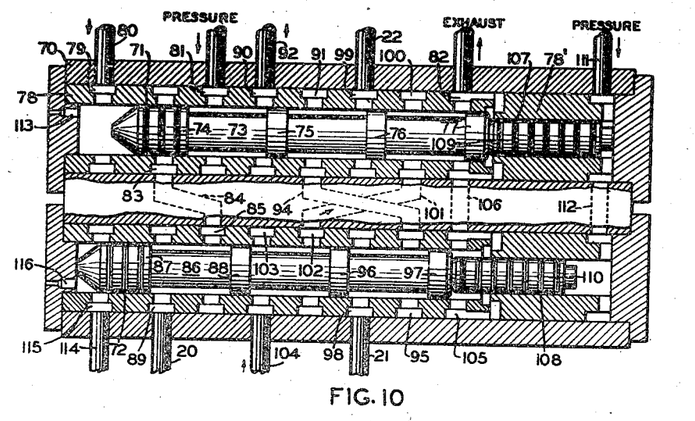
Fig. 10 is a fragmentary sectional view through the hydraulic synchronizer showing one of the valve elements thereof in an alternative position to which it may be actuated.

The hydraulic synchronizing device of my invention is shown in Figs. 8 and 10 and comprises a casing 70 having a pair of axially extending bores 71 and 72. In each of these bores is slidably mounted a valve spool and since they are of substantially identical design an explanation of one thereof is considered sufficient. The valve spool indicated at 73, which is slidably mounted in the bore 71, is provided with a plurality of axially spaced lands 74, 75, 76 and 77. A sleeve 78, within which the piston valve 73 is mounted, is secured within the casing 70 and is provided with a plurality of circumferentially extending grooves having diametrically opposed ports therein which communicate between the respective grooves and the bore 71. A first of said grooves, indicated at 79, is connected through a conduit 80 with the control valve 6. A second groove 81 is connected with a source of fluid under pressure; and a third thereof, groove 82, is connected with exhaust. In the position of the valve spool 73 shown in Fig. 8, fluid under pressure may be supplied through groove 81 and its associated ports to the bore 71 and between the spaced lands 74 and 75 through ports to a groove 83, which is connected through a passage 84 to a groove 85 extending about and communicating through ports with the second bore 72 of the synchronizing device.

Figure 9:
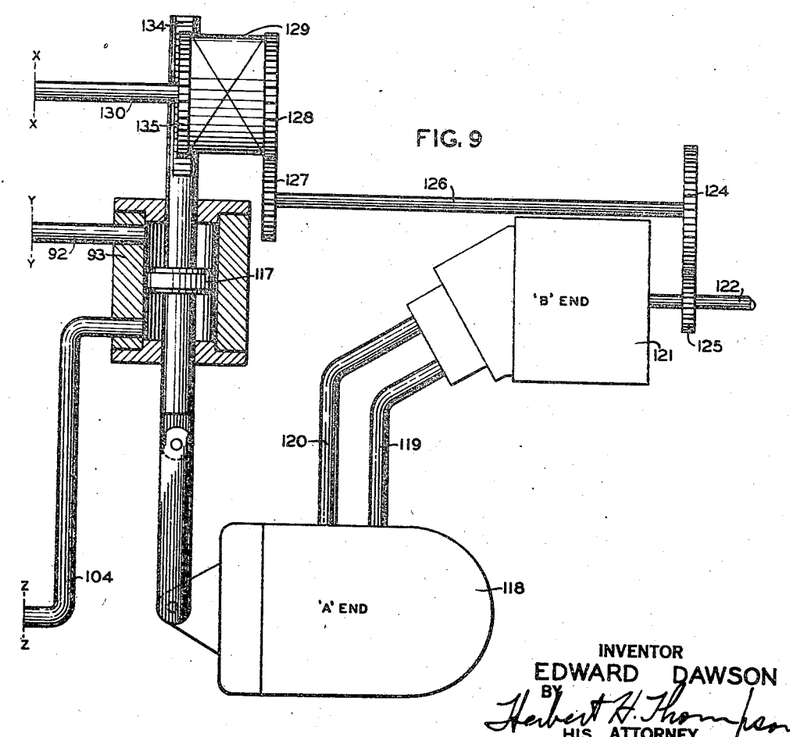
Fig. 9 discloses the balance of the system shown in Fig. 8, the connecting parts thereof being represented as cut off at the dash-dot lines $x$—$x$, $y$—$y$ and $z$—$z$.

The spool 86 slidably mounted in bore 72 is substantially identical with spool 73. Fluid passing from the groove 85 and between the lands 87 and 88 of piston 86 may pass through ports to groove 89 and thence through conduit 20 which is connected therewith and with valve 11. Between the lands 75 and 76 of piston 73 is disposed a pair of grooves 90 and 91, groove 90 being connected with conduit 92 which, as shown in Fig. 9, is connected with the head end of a stroking cylinder 93. Groove 91 communicates with passage 94 which in turn communicates with a groove 95 disposed about the valve spool 86 and between the lands 96 and 97 thereof. A second groove 98 disposed between said lands communicates through conduit 21 with the control valve 11.

Conduit 22 which, as above described, is connected at one end with control valve 11 is also connected with the synchronizer and communicates with a groove 99 which encircles the spool 73 and lies between the lands 76 and 77 thereof. A second groove 100 also lying between the lands 76 and 77 communicates through passage 101 with a groove 102 encircling the valve spool 86 and lying between the lands 88 and 96 thereof. A second groove 103 also disposed between the lands 88 and 96 communicates with conduit 104 which is connected to the crank end of the stroking cylinder 93. A groove 105 corresponding to groove 82, above described, encircles the bore 72 and communicates through ports therewith and through passage 106 with groove 82.

The bores 71 and 72, as illustrated, are of somewhat smaller diameter at one end thereof as indicated at 107 and 108, respectively, and pistons 109 and 110 are slidably mounted therein. The diameter of pistons 109 and 110 is preferably about 70% of the diameter of the lands of the spools 73 and 86. Fluid under pressure is normally supplied through conduit 111 to the space within the zone 107 of the bore and between the piston 109 and the end of the casing. A passage 112 between the ends of the bores 107 and 108, serves to supply fluid under pressure to the space between the piston 110 and the adjacent end of the casing. Under these conditions, pistons 109 and 110 serve normally to urge the spools 73 and 86 toward the left, as viewed in Fig. 8, maintaining the opposite ends of the spools against their associated end walls of the casing.

Preferably, the last-mentioned ends of the spools 73 and 86 are of frusto-conical form and fluid under pressure may be supplied through the conduit 80 to the space between the frusto-conical end of the spool 73 and the adjacent end of the casing. An orifice 113 is provided in the end of the casing for the exhaust of the fluid so supplied thereto. Fluid may also be supplied through conduit 114 which is connected at one end with the valve 6 and at the other end thereof with groove 115 which surrounds the spool 86 and communicates through ports with the bore 72 adjacent the frusto-conical end section of the spool 86. Likewise, an orifice 116 is provided for the exhaust of fluid from the end of bore 72.

The positions of the spools 73 and 86 illustrated in Fig. 8 are the positions which they normally occupy when control over the associated servomotor is exercised by the fine control valve.

Under the above conditions, fluid under pressure may pass to the synchronizer and to groove 81 thereof, passing therefrom through groove 83, passage 84, grooves 85 and 89 to conduit 20. Assuming that the fine control valve occupies a position wherein the conduits 20 and 21 are connected with each other through the valve, full fluid pressure will be present in conduit 20 and its passage therefrom to conduit 21 will be controlled by valve 11. Fluid may then pass through conduit 21 back to the synchronizer, through grooves 98 and 95, passage 94 and grooves 91 and 90 to the conduit 92 which is connected with the head end of the stroking piston 93. This will cause the stroking piston 117 to move downwardly as illustrated in Fig. 9, and thereby control the "A" end of a hydraulic transmission indicated generally at 118. The hydraulic transmission herein illustrated is shown mainly for exemplary purposes, and it will be understood that movement of the stroking piston to either side of its central or neutral position will vary the displacement of the "A" end and thereby control both the direction and rate of operation of the "B" end of the unit. The "A" end is driven by a suitable motor (not shown) and fluid under pressure is supplied through either the conduits 119 or 120 to the "B" end, being returned through the other of said conduits. The "B" end 121 of the unit constitutes a hydraulically driven motor and its output or load shaft 122 may be suitably connected to drive a positionable element.

Under the above assumed position of the fine control valve, fluid is supplied therethrough and controlled thereby to the head end of the stroking cylinder 93. At the same time, valve 11 will control the exhaust of fluid from the crank end of the stroking cylinder, fluid passing through the conduit 104 to the synchronizer, through grooves 103 and 102, passage 101, grooves 100 and 99 and thence through conduit 22 to the control valve 11. Fluid may then pass through the valve 11 to the exhaust conduit 23. While the pistons 73 and 86 of the synchronizer remain in the positions illustrated in Fig. 8, the fine control valve 11 may control the passage of fluid under pressure to either the head or crank end of the stroking cylinder and the exhaust of fluid from the other end thereof.

Assuming, however, that the angular displacement between the positionable element driven by the "B" end of the hydraulic transmission or servomotor and the reference member exceeds a predetermined maximum value, the coarse control valve 6, to which fluid under pressure is supplied through the conduit 123, will operate to pass fluid through the conduit 80 and to the space between the frusto-conical end of spool 73 and the adjacent end of the casing 70. When this error angle exceeds the predetermined value, the port opening in valve 6 will be of such size order as to produce fluid pressure against the conical surface of the end of spool 73 of the synchronizer sufficient to overcome the force applied to the piston 109. Initially, this fluid pressure will be exerted only upon the conical sides of the spool 73 and not upon the base thereof which abuts the end of the casing. However, upon an initial movement of the spool 86 to the right as viewed in Fig. 8, fluid pressure will be exerted against the entire end surfaces of the spool and cause it rapidly to move to an alternative position such as that shown in Fig. 10. When this occurs, fluid under pressure is prevented from passing from the groove 81 of the synchronizer to the groove 83 and thence through conduit 20 to the control valve 11 because the land 74 will overlie the port communicating between the groove 83 and the bore 71. At the same time, the fluid under pressure from the groove 81 will pass directly to the conduit 92 and to the head end of the stroking cylinder, thereby causing the "B" end of the unit to accelerate to maximum velocity while rendering the fine control valve temporarily ineffective. At the same time, the crank end of the stroking piston will be connected directly to exhaust. In other words, fluid may flow through the conduit 104, grooves 103 and 102, passage 101, groove 100 and between the lands 76 and 77 of piston 73 to groove 82 and thence to exhaust.

Likewise, if the fine control valve were controlling the flow of fluid under pressure to the crank end of the stroking piston and the error angle were to exceed the predetermined maximum value, coarse control valve 6 would operate in a manner similar to that above described to supply fluid under pressure to the space between the frusto-conical end of spool 86 and the adjacent end of the casing of the synchronizer sufficient to apply a force to the spool 86 causing it to assume a position similar to that of piston 73 illustrated in Fig. 10. When this occurs, the crank end of the stroking cylinder will be connected directly to the source of fluid under pressure which lies in communication with the groove 81, and the head end of the stroking cylinder will be connected directly to exhaust. In this assumed position of the spool 86, fluid under pressure will flow from the groove 81 to groove 83, through passage 84 and groove 85 to groove 103 which lies in communication with conduit 104 connecting with the crank end of the stroking cylinder. The head end thereof through conduit 92 is connected with grooves 90 and 91, passage 94, groove 95 and through the space between the lands 96 and 97 with the groove 105 which is connected through passage 106 with groove 82 and exhaust.

In the embodiment of my invention shown in Figs. 8 and 9, the sleeves of the control valves 6 and 11 are moved in proportion to the movement of the load shaft 122 of the "B" end of the unit or proportionally to the movement of the positionable member. In the embodiment shown, this is accomplished through the medium of gear 124 meshing with gear 125 which is mounted on the drive shaft of the "B" end of the unit. The gear 124 through shaft 126 drives gear 127 which meshes with gear 128 constituting one arm of a differential indicated generally at 129. A second arm comprising the planetary gears of the differential drive shaft 130 on which is mounted bevel gear 131 (see Fig. 8) which in turn meshes with bevel gear 132 mounted on the shaft 133 on which is also mounted the driving gear 62 for the connecting gear train of the fine and coarse control valves. Hence, when the servo motor or hydraulic transmission unit is actuated in one direction or the other, the sleeves of the coarse and fine control valves will be rotated in corresponding directions and the magnitude of operation of the servomotor will also be reflected in the magnitude of rotary movement of the valve sleeves.

For stabilizing purposes, I have provided in the embodiment illustrated a rack 134 which is operatively connected with the stroking piston 117 and engages the third arm or gear 135 of the differential 129. With this arrangement, when the stroking piston 117 is moved to control or adjust the speed of the "B" end of the servo unit in response to a signal, the resulting motion of the stroking piston is imparted through the differential, shaft 130 and the gear train driven thereby to the sleeves of the valves causing them to follow the position of the rotary valve spool.

By referring to Fig. 11, it will be observed that when the error signal which may be represented or measured by the angular displacement between the rotary valve member and sleeve of the coarse control valve drops below the predetermined maximum for fine valve control, the fluid pressure, controlled by the coarse valve, which exists in the synchronizer, will decrease to a value sufficient to permit the spool 73 or 86, as the case may be, to return to the position thereof illustrated in Fig. 8, under the force of fluid pressure applied to the associated piston. The angular displacement of the rotary valve spool and sleeve when pressure in the synchronizer decreases to a value sufficient operatively to connect the fine control valve in controlling relation to the servomotor may be indicated at the point $b$ on the curve 68. The corresponding point on the curve 69 will lie at point $c$. It will be observed that for this position of both the fine and coarse control valves that the curves both lie on the same side of the axes $a$—$a$ representing a decreasing angle of the sleeve and therefore it is proper at this point to transfer control from the coarse to the fine valve.

If the coarse control valve were to transfer control to the fine control valve at some point 180° removed from the above point, or at a point corresponding to the point $d$ on the curve 69, it will be observed that the fine control valve will be operating on the increasing angle of sleeve valve portion of its curve and would therefore produce a greater angle of error. Therefore, the coarse control valve would again take over control causing the positionable element to be oriented throughout 180° when the coarse valve could again return control to the fine valve at the points $c$ and $b$ on the curves. Under these conditions, therefore, synchronization and return of the fine control valve to control over the servo can only take place when the error angle lies within the predetermined maximum, and ambiguity of 180° cannot result.

Furthermore, it may be observed that the controlling action of the fine control valve, that is, the magnitude of change in port openings for a given change in error angle, is many times larger than the corresponding port opening which would be provided with the coarse control valve, and hence much more accurate control over the servo is effected and a closer following of the positionable element in its movement with that of the reference member.

It will be understood that in the servo system and the servo control system, the operating fluid is preferably oil. Furthermore, hydraulically operable, electrical switches such as that indicated at 136 may be connected in the control system whereby electrically to control a signal device or electrical valves and the like. In the embodiment shown in Fig. 8, switch 136 is connected to conduit 20 and hence will be operated when control is taken away from or restored to the fine control valve 11.

It will be understood that by the terms "servomotor" or "hydraulically operable motor means" as employed in the foregoing and in the appended claims in its broad sense, I mean to include a stroking cylinder or a hydraulic motor such as a comparatively small rotary motor which constitutes the work-performing unit rather than a control element.

Furthermore, the particular servo system herein disclosed is intended mainly for exemplary purposes, and the synchronizer may be employed with many different types of servo systems.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a hydraulic control system, hydraulically operable motor means, conduit means for supplying to and exhausting fluid from said motor means, a coarse fluid-control valve and a fine fluid-control valve included in said conduit means for controlling the flow of fluid therethrough, and fluid-pressure responsive means operatively connected with said coarse valve and including means responsive to fluid pressure supplied thereto through said coarse valve for connecting said fine valve in controlling relation to said motor means and for connecting said motor to a source of fluid under pressure.

2. In a hydraulic control system, hydraulically operable reversible motor means, conduit means for supplying to and exhausting fluid from said motor means, a coarse fluid-control valve and a fine fluid-control valve included in said conduit means for controlling the flow of fluid therethrough, and fluid-pressure responsive means operatively connected with said coarse valve and including means responsive to fluid pressure supplied thereto through said coarse valve for connecting said fine valve in controlling relation to said motor means and for connecting either a first side of said motor means to a source of fluid under pressure and the second side thereof to exhaust or said second side to said fluid source and the first side to exhaust.

3. In a hydraulic control system, hydraulically operable reversible motor means, conduit means for supplying to and exhausting fluid from said motor means, a coarse fluid-control valve and a fine fluid-control valve included in said conduit means for controlling the flow of fluid therethrough, and a pair of hydraulically operable valve means jointly operable when in one position thereof to connect said fine valve in controlling relation to said motor means but separately movable to second positions rendering said fine valve ineffective and connecting opposite sides, respectively, of said motor means to a source of fluid under pressure and the other side of said motor means to exhaust, the operation of said valve means being controlled by said coarse valve.

4. In a hydraulic control system, hydraulically operable, reversible motor means, a source of fluid under pressure, conduit means for supplying to and exhausting fluid from said motor means, a fine fluid-control means for controlling the flow of fluid to one side of said motor and the exhaust thereof from the other side, hydraulically operable synchronizing means movable to a first position connecting said motor on one side directly with said source of fluid pressure and on the other side to exhaust and to a second position operatively connecting said fine fluid-control means in controlling relation to said motor, means for hydraulically urging said synchronizing means to the said second position thereof, and means including a coarse fluid-control means operable hydraulically to actuate said synchronizing means to said first position.

5. In a hydraulic control system, a servomotor, hydraulically operable, displaceable means for controlling the direction and rate of operation of said servo, a source of fluid under pressure, means for supplying to and exhausting fluid from said displaceable means, a fine fluid-control means for controlling the flow of fluid to one side of said displaceable means and the exhaust thereof from the other side, hydraulically operable synchronizing means movable to a first position connecting one side of said displaceable means directly with said source of fluid pressure and the other side thereof to exhaust and to a second position operatively connecting said fine fluid-control means in controlling relation to said displaceable means, and a coarse fluid-control means for controlling the operation of said synchronizing means.

6. In a hydraulic control system, hydraulically operable motor means, conduit means for supplying to and exhausting fluid from said motor means, a coarse fluid-control valve and a fine fluid-control valve operatively included in said system and means for effecting simultaneous operations thereof in unequal but constant ratio magnitudes, and hydraulically operable means operatively connected to and controlled by said coarse valve for alternatively connecting said fine valve in controlling relation to said motor means and for connecting said motor to a source of fluid under pressure.

7. In a hydraulic control system, hydraulically operable reversible motor means, conduit means for supplying to and exhausting fluid from said motor means, a coarse fluid-control valve and a fine fluid-control valve operatively included in said system and means for effecting simultaneous operations thereof in unequal but constant ratio magnitudes, and hydraulically operable synchronizing means including two independently movable valve elements, each thereof being movable to positions operatively connecting said fine valve in controlling relation to said motor, one of said elements being movable to alternative positions connecting said fine valve in controlling relation to said motor means and, respectively, connecting a first side of said motor means to a source of fluid under pressure and the second side thereof to exhaust, and the other of said elements being movable to a position connecting said fine valve in controlling relation to said motor means and to a position connecting the second side of said motor means to a source of fluid under pressure and the first side thereof to exhaust, and means controlled by said coarse valve for moving the valve elements of said synchronizing means.

8. In a hydraulic control system, hydraulically operable motor means, conduit means for supplying to and exhausting fluid from said motor means, a coarse fluid-control valve and a fine fluid-control valve included in said conduit means for controlling the flow of fluid therethrough, and fluid-pressure responsive means operatively connected with said coarse valve and including means responsive to fluid pressure supplied thereto through said coarse valve for rendering said fine valve effective to control said motor means and alternatively for rendering said fine valve ineffective to control said motor means.

9. A system of the character recited in claim 8 in which the fluid pressure-responsive means renders said fine valve effective to control the motor means when the fluid pressure supplied from said coarse valve is less than a predetermined value and ineffective to control said motor means when the fluid pressure supplied from said coarse valve exceeds said predetermined value.

EDWARD DAWSON.

REFERENCES CITED

The following references are of record in the file of this patent:

UNITED STATES PATENTS

| Number | Name | Date |
|---|---|---|
| 2,058,642 | Sperry | Oct. 27, 1936 |
| 1,787,328 | Schottler | Dec. 30, 1930 |
| 2,260,979 | Morin et al. | Oct. 28, 1941 |
| 2,283,397 | Tucker | May 19, 1942 |
| 1,943,061 | Douglas | Jan. 9, 1934 |
| 1,481,645 | Kaminski | Jan. 22, 1924 |
| 2,160,779 | Granst | May 30, 1939 |
| 2,191,792 | Hill | Feb. 27, 1940 |
| 2,263,315 | Rose | Nov. 18, 1941 |